United States Patent [19]

Isobe et al.

[11] 4,362,139
[45] * Dec. 7, 1982

[54] VIBRATION ABSORBER FOR CENTRIFUGAL GOVERNOR

[75] Inventors: Hiroshi Isobe; Masao Yoshino; Koji Fukushima, all of Higashi-Matsuyama, Japan

[73] Assignee: Diesel Kiki Co., Ltd., Tokyo, Japan

[*] Notice: The portion of the term of this patent subsequent to Apr. 28, 1997, has been disclaimed.

[21] Appl. No.: 234,399

[22] Filed: Feb. 13, 1981

Related U.S. Application Data

[63] Continuation of Ser. No. 969,319, Dec. 14, 1978, Pat. No. 4,263,881.

[30] Foreign Application Priority Data

Dec. 28, 1977 [JP] Japan .................... 52-175760

[51] Int. Cl.³ .................................. F02D 31/00
[52] U.S. Cl. ....................... 123/364; 464/3; 464/180; 73/526
[58] Field of Search ............... 123/364; 464/3, 180; 73/526

[56] References Cited

U.S. PATENT DOCUMENTS

| 2,645,237 | 7/1953 | Wheeler | 73/526 |
| 3,269,193 | 8/1966 | Kleeberger | 73/526 |
| 3,841,111 | 10/1974 | Staudt et al. | 123/364 |

FOREIGN PATENT DOCUMENTS

| 814814 | 8/1951 | Fed. Rep. of Germany | 123/364 |
| 589454 | 1/1978 | U.S.S.R. | 123/364 |

*Primary Examiner*—Charles J. Myhre
*Assistant Examiner*—Magdalen Moy
*Attorney, Agent, or Firm*—Frishauf, Holtz, Goodman and Woodward

[57] ABSTRACT

A vibration absorber which comprises a damper provided between the flyweights and the shifter of a centrifugal governor for absorbing or lessening axial and/or radial vibrations produced in the flyweights. The absorber has a very simple construction, of which manufacture, mounting and maintenance can be carried out with facility. Also, it is free from resonance of the damper and its neighboring parts.

8 Claims, 5 Drawing Figures

FIG. I  PRIOR ART
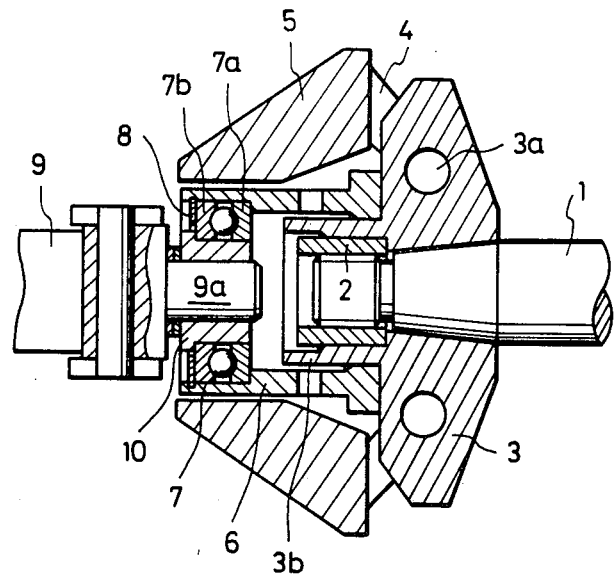
FIG. 2
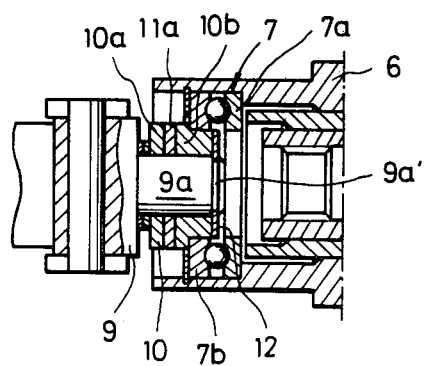

VIBRATION ABSORBER FOR CENTRIFUGAL GOVERNOR

This is a continuation, of application Ser. No. 969,319 filed Dec. 14, 1978 and now U.S. Pat. No. 4,263,881.

FIELD OF THE INVENTION

The present invention relates to a centrifugal governor for use with an internal combustion engine, and particularly to an absorbing means for absorbing or lessening vibrations occurring in the flyweights of the centrifugal governor.

BACKGROUND OF THE INVENTION

In an internal combustion engine, particularly in a Diesel engine, an injection pump such as in-line type or distributor type is used for feeding fuel under pressure to a cylinder or cylinders of the engine. Generally, such injection pump includes a cam shaft connected to the driving shaft of the engine for rotation therewith, and one or more plunger means arranged to be driven by the rotating cam shaft for reciprocal motion to feed under pressure or inject fuel to the cylinder or cylinders of the engine.

It is conventionally known that in these injection pumps the cam shaft undergoes a change in torque between the injection stroke and the non-injection or return stroke of the plunger so that there occurs a torsional vibration in the cam shaft, resulting in variations in the angular velocity of the cam shaft. Such an injection pump is provided with a centrifugal governor which is usually arranged within the housing pump for varying the injection quantity of the injection pump to control the engine speed through displacement of the shifter which is movable in response to opening or closing motion, i.e., radially outward or inward pivoting of the flyweights pivotally mounted on the cam shaft of the injection pump. Under such arrangement, the cam shaft of the pump may sometimes be subject to torsional vibration, which in turn causes vibration of the flyweights and other governor component elements connected thereto including the shifter, links such as a tension lever and a floating lever, and control rack, thus resulting in the disadvantage that the governor fails to stably control the engine and the points of contact between the individual component elements undergo abrasion or wear.

In order to eliminate such disadvantage, it has conventionally been proposed to interpose a vibration absorbing material such as a rubber damper between the cam shaft of the pump and the flyweights. This measure is now generally employed. However, it requires a rather complicated contruction. Further, since removal of the cam shaft from the pump is not so easy, there occur many problems in the manufacture, mounting and maintenance of such absorbing material, resulting in very low mass productivity and practicability. Furthermore, the frequency of torsional vibration of the rotating cam shaft may often be equal to the proper or natural vibration frequency of the rubber used as the damper. In such event, the two members resonate to provide a source of vibration, imparting a torsional vibration of larger amplitude to the flyweights.

OBJECTS OF THE INVENTION

It is an object of the invention to provide a vibration absorber for a centrifugal governor, which is capable of effectively absorbing the axial and/or radial vibrations occurring in the flyweights through its simple construction, and of which the manufacture, mounting and maintenance can be carried out with facility.

It is another object of the invention to provide a vibration absorber for use in a centrifugal governor, which is free from resonance of the component parts of the governor as a source of vibration.

BRIEF DESCRIPTION OF THE INVENTION

FIG. 1 is a vertical sectional view showing the flyweight portion of a conventional type centrifugal governor;

FIG. 2 is a vertical sectional view showing a first embodiment of the present invention;

DETAILED DESCRIPTION OF THE INVENTION

Figure 3:
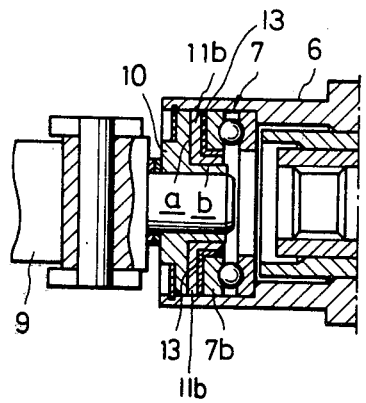
FIG. 3 is a vertical sectional view of a second embodiment thereof.

FIG. 1 illustrates the flyweight portion of a conventional type centrifugal governor. A flyweight holder 3 is secured to the cam shaft 1 rotatably and drivingly engaging an injection pump, not illustrated, in which the governor is mounted, by means of a nut 2 engaging a boss 3b axially extending from said flyweight holder 3. A pair of flyweights 5, 5 are supported on said flyweight holder 3 via a pair of links 4, 4 in a fashion that the flyweights 5, 5 can pivot radially outwardly or inwardly for opening or closing motion about respective pins 3a fitted in the flyweight holder 3 due to a centrifugal force produced by the rotation of the cam shaft 1. Slidably fitted over said boss 3b of the flyweight holder 3 is a sleeve 6 which is arranged to be urged by the foot portions, not illustrated, of the links 4 adapted to be actuated in response to an opening motion of the flyweights 5, 5 to slide on said boss 3b away from the flyweights while simultaneously rotating about its own axis. Force fitted in an end portion of said sleeve 6 opposite to an end thereof adjacent said flyweights is a thrust ball bearing 7 which is retained within the sleeve 6 by a snap ring 8. Said thrust ball bearing 7 has one stationary ring 7a force fitted in the sleeve 6 and the other stationary ring 7b force fitted in a bush 10 which in turn is force fitted in an extending member at a supporting end 9a of the shifter 9. With this arrangement, the flyweights 5, 5 are caused to open or close in response to rotation of the cam shaft 1, for urging the sleeve 6 toward the shifter 9 via the links 4 according to the opening thereof so that the shifter 9 is displaced. On this occasion, vibration is produced in the flyweights 5, 5 by the torsional vibration of the cam shaft 1 as hereinbefore referred to and can be transmitted through links 4, 4, sleeve 6 and bearing 7 to the shifter 9 to cause vibration of the shifter 9 in the axial and/or radial direction of the governor, thus preventing the shifter 9 from being stably and precisely displaced for control of the injection quantity of the pump.

FIGS. 2, 3, 4 and 5 show several embodiments of the invention. In these drawings, the cam shaft, the flyweights and other elements are constructed and arranged in a similar manner to the above-described conventional centrifugal governor. Accordingly, detailed description of the construction and arrangement of the centrifugal governor used in the embodiments of the invention is omitted here, and the main portion of the governor is not illustrated in the drawings for simplification of the illustration. Also in these figures, parts and elements corresponding to those in FIG. 1 are designated by numerals identical with those in FIG. 1.

Referring first to FIG. 2 which illustrates a first embodiment of the invention, as in the aforedescribed conventional centrifugal governor, the shifter 9 has an extending member at its supporting end 9a inserted within an end portion of the sleeve 6 opposite to an end thereof adjacent the flyweights, not illustrated, and a bush is force fitted over said supporting end 9a. Also fitted in the sleeve 6 at a location between the bush 10 and the inner wall of the sleeve 6 is a thrust ball bearing 7. Said bush 10 is axially split in two parts, that is, consists of two segments 10a, 10b axially arranged, between which is interposed a damper 11a which can be made of an elastic material such as rubber or a plate spring.

With this arrangement, when axial vibration produced in the flyweights not illustrated has been transmitted through the sleeve 6, the bearing 7 and the segment 10b of the bush 10 facing toward the flyweights in said order, the damper 11a absorbs the vibration to keep it from being further transmitted to the shifter 9. Incidentally, in this embodiment, the shifter 9 has said supporting end 9a formed with a circumferentially extending groove 9a' and secured to the bush 10 by a snap ring 12 fitted in said groove 9a' and is thus prevented from disengagement from the bush 10.

Referring next to FIG. 3 showing a second embodiment of the invention, the bush 10 is force fitted over the extending member at the supporting end 9a of the shifter 9 with a peripheral lateral edge thereof urged directly against the inner wall of the sleeve 6. Accordingly, the thrust ball bearing 7 is mounted in the sleeve 6 at an inward location or toward the flyweight with respect to the bush 10. A damper 11b having an L-shaped section is interposed between the bush 10 and the stationary ring 7b of the bearing 7 facing toward the bush 10 via a supporting member 13 also having an L-shaped section, with one surface a thereof axially facing and another surface b radially facing. Accordingly, axial vibration is absorbed in the surface a and radial vibration in the surface b respectively, thus allowing attenuation of both axial and radial vibrations.

Figure 4:
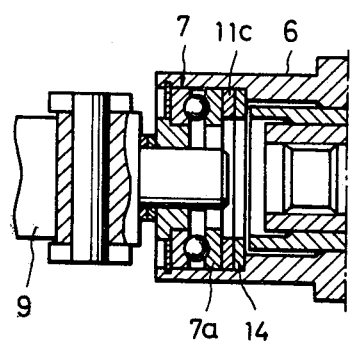
FIG. 4 is a vertical sectional view of a third embodiment thereof.

FIG. 4 shows a third embodiment of the invention, in which a washer 14 is force fitted in place within the sleeve 6, and a thrust ball bearing 7 is fitted in the sleeve 6 in a position toward the shifter 9 with respect to said washer 14. A damper 11c is interposed between the washer 14 and the ring 7a of the bearing 7 facing toward the flyweights. Since the washer 14, damper 11c and bearing 7 are axially arranged in series, axial vibration transmitted to the sleeve 6 is absorbed by the damper 11c to keep it from being further transmitted to the bearing 7 for prevention of damage to the bearing or malfunction thereof.

Figure 5:
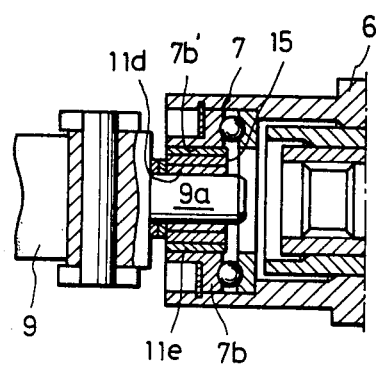
FIG. 5 is a vertical sectional view of a fourth embodiment thereof.

Finally in FIG. 5 showing a fifth embodiment of the invention, the thrust ball bearing 7 includes a ring 7b having an L-shaped section facing toward the shifter 9 which has a boss 7b' extending axially toward the shifter 9. Rubber-made dampers 11d, 11e are stuck by baking on the peripheral lateral surface of the supporting end 9a of the shifter 9 as well as on the inner surface of the boss 7b' of the ring 7b facing said peripheral lateral surface of the supporting end 9a, respectively. Intervening between said dampers 11d, 11e is a supporting material 15. Thus, the shifter 9 and the ring 7b of the thrust ball bearing 7 are connected together through dampers 11d, 11e and supporting material 15. With this arrangement, axial vibration transmitted from the flyweights not shown via sleeve 6 is subject to attenuation due to axial elastic deformation of the dampers 11d, 11e, whereas radial vibration is absorbed by the dampers 11d, 11e through their radial elastic deformation. Thus, this arrangement can absorb vibration in both the axial and radial directions of the governor.

The material for the damper used in the invention is not an important feature per se and can preferably be rubber a or plate spring as previously noted, but any other suitable material may be used. Also, regarding the configuration, the damper can preferably be of an annular shape, but the invention is not limited thereto; it also can comprise a plurality of pieces arranged around the supporting end of the shifter, for instance.

Incidentally, in all the above-described embodiments, a thrust ball bearing is used as preferable one. However, this type is not limitative to the invention but any other types including radial ball bearing can of course be used in the invention.

As clarified in the foregoing description and the accompanying drawings, the vibration absorber according to the invention is capable of effectively absorbing axial and/or radial vibrations produced in the flyweights during operation of the centrifugal governor through its very simple construction. Further, since the shifter portion on which the dampers are mounted can be removed from the governor body in a relatively easy manner, the manufacture, mounting and maintenance of the dampers can be carried out with facility. Particularly, since the dampers are not arranged in direct contact with the cam shaft but arranged between the flyweights and the shifter of the governor, the absorber according to the invention will not cause a resonance with its neighboring parts or members as a source of vibration as is inherent in the conventional arrangement in which the damper is provided between the flyweights and the cam shaft, thus being largely effective to prevent such phenomena as hunting of the engine and knocking of the car which may be attributed to the vibration of the control rack of the centrifugal governor.

Having described specific embodiments of the invention, it is believed obvious that modification and variation of the invention is possible in light of the above teachings.

What is claimed is:

1. A centrifugal governor for use with a fuel injection pump controlling the speed of an engine, the governor comprising:
   a rotatable cam shaft adapted to be drivingly coupled to said fuel injection pump;
   a plurality of flyweights pivotally mounted on said cam shaft so as to pivotally move radially outwardly of said cam shaft due to acceleration in the rotation of said cam shaft and to pivotally move inwardly toward said cam shaft due to a deceleration in the rotation of said cam shaft;
   a shifter coupled to said flyweights and arranged for displacement in response to said radially outward and inward pivotal movements of said flyweights, said shifter having two ends, one end of which comprises an extending member;
   said governor being actuatable in response to said displacement of said shifter for varying the injection quantity of said fuel injection pump to provide a controlled engine speed;

a sleeve arranged for displacement in response to said radially outward and inward pivotal movements of said flyweights, said extending member at said one end of said shifter being engaged within said sleeve for displacement together with said sleeve;

a bush fitted over said extending member at said one end of said shifter, said bush being axially split in two parts; and a vibration damper means having opposite sides respectively interposed between said two parts of said bush so as to be located between said sleeve and said extending member of said shifter for absorbing vibrations of said flyweights, thereby preventing said flyweight vibrations from being transmitted to said shifter.

2. A centrifugal governor as recited in claim 1, in which said vibration damper means comprises a damper made of rubber.

3. A centrifugal governor as recited in claim 1, in which said vibration damper means comprises a damper made of a plate spring.

4. A centrifugal governor as recited in claim 1, including a bearing interposed between said sleeve and said bush.

5. A centrifugal governor for use with a fuel injection pump controlling the speed of an engine, the governor comprising:

a rotatable cam shaft adapted to be drivingly coupled to said fuel injection pump;

a plurality of flyweights pivotally mounted on said cam shaft so as to pivotally move radially outwardly of said cam shaft due to acceleration in the rotation of said cam shaft and to pivotally move inwardly toward said cam shaft due to a deceleration in the rotation of said cam shaft;

a shifter coupled to said flyweights and arranged for displacement in response to said radially outward and inward pivotal movements of said flyweights, said shifter having two ends, one end of which comprises an extending member;

said governor being actuatable in response to said displacement of said shifter for varying the injection quantity of said fuel injection pump to provide a controlled engine speed;

a sleeve arranged for displacement in response to said radially outward and inward pivotal movements of said flyweights, said extending member at said one end of said shifter being engaged within said sleeve for displacement together with said sleeve;

a bush fitted over said extending member at said one end of said shifter;

said sleeve having an inner wall and said bush having a peripheral lateral edge urged directly against said inner wall of said sleeve;

a vibration damper means having an L-shaped section and being interposed between said sleeve and said bush, said damper means having a first surface facing axially of said sleeve and a second surface facing radially of said sleeve, said damper means being thereby located between said sleeve and said extending member of said shifter for absorbing vibrations from being transmitted to said shifter.

6. A centrifugal governor as recited in claim 5, including a supporting member having an L-shaped section; and a bearing interposed between said damper means and said sleeve via said supporting member.

7. A centrifugal governor for use with a fuel injection pump controlling the speed of an engine, the governor comprising:

a rotatable cam shaft adapted to be drivingly coupled to said fuel injection pump;

a plurality of flyweights pivotally mounted on said cam shaft so as to pivotally move radially outwardly of said cam shaft due to acceleration in the rotation of said cam shaft and to pivotally move inwardly toward said cam shaft due to a deceleration in the rotation of said cam shaft;

a shifter coupled to said flyweights and arranged for displacement in response to said radially outward and inward pivotal movements of said flyweights, said shifter having two ends, one end of which comprises an extending member;

said governor being actuatable in response to said displacement of said shifter for varying the injection quantity of said fuel injection pump to provide a controlled engine speed;

a sleeve arranged for displacement in response to said radially outward and inward pivotal movements of said flyweights, said extending member at said one end of said shifter being engaged within said sleeve for displacement together with said sleeve;

a washer fitted in said sleeve;

a bearing fitted in said sleeve in a position toward said shifter with respect to said washer; and a vibration damper means interposed between said washer and said bearing, said washer, damper means and said bearing being axially arranged in series, said damper means absorbing vibrations of said flyweights, thereby preventing said flyweight vibrations from being transmitted to said shifter.

8. A centrifugal governor as recited in any one of claims 5, 6, or 7 in which said vibration damper means is made of resilient material.

* * * * *